United States Patent
Lemon (10) Patent No.: US 6,260,854 B1
(45) Date of Patent: Jul. 17, 2001

(54) FLAT GASKET RING

(75) Inventor: Barry Lemon, Stetton (CH)

(73) Assignee: Georg Fischer Rohleitungssysteme AG, Schaffhausen (CH)

( * ) Notice: Subject to any disclaimer, the term of this patent is extended or adjusted under 35 U.S.C. 154(b) by 0 days.

(21) Appl. No.: 09/415,439

(22) Filed: Oct. 8, 1999

(30) Foreign Application Priority Data

Oct. 9, 1998 (DE) .............................................. 198 46 475

(51) Int. Cl.$^7$ .............................. F16L 17/06; F16L 17/00
(52) U.S. Cl. .......................... 277/609; 277/612; 277/616; 277/917; 285/368
(58) Field of Search ..................................... 277/608, 609, 277/612, 616, 627, 917; 285/368

(56) References Cited

U.S. PATENT DOCUMENTS

| | | | |
|---|---|---|---|
| 811,000 | * | 1/1906 | Tompkins . |
| 3,278,883 | * | 10/1966 | Lipsey . |
| 3,480,301 | | 11/1969 | Kroening . |
| 3,721,452 | * | 3/1973 | Black . |
| 3,730,537 | * | 5/1973 | Ward et al. . |
| 3,781,043 | * | 12/1973 | Hagmann . |
| 3,909,011 | * | 9/1975 | Sheesley . |
| 4,002,344 | * | 1/1977 | Smith . |
| 4,095,809 | * | 6/1978 | Smith . |
| 4,103,900 | * | 8/1978 | Wittersheim . |
| 4,396,201 | * | 8/1983 | Rudd et al. . |
| 4,848,730 | * | 7/1989 | Logman et al. . |
| 5,163,721 | * | 11/1992 | Babuder . |
| 5,461,904 | * | 10/1995 | Baker . |
| 5,472,214 | | 12/1995 | Wainer et al. . |

FOREIGN PATENT DOCUMENTS

| | | |
|---|---|---|
| 1762329 | 9/1956 | (DE) . |
| 1953035 | 7/1966 | (DE) . |
| 2263902 | 7/1973 | (DE) . |
| 2335448 | 6/1974 | (DE) . |
| 2851566 | 6/1980 | (DE) . |
| 9405913 | 12/1984 | (DE) . |
| 0778340 | 6/1997 | (EP) . |
| 921343 | 6/1999 | (EP) . |
| 923015 | 4/1963 | (GB) . |
| 1234713 | 6/1971 | (GB) . |

\* cited by examiner

*Primary Examiner*—Chuck Y. Mah
*Assistant Examiner*—Vishal Patel
(74) *Attorney, Agent, or Firm*—Bachman & LaPointe, P.C.

(57) ABSTRACT

Flat gasket ring, in particular for producing a flange connection between moldings, the flat gasket ring having, along its outer circumferential line, lip structures which are intended for accommodating the gasket ring in a positively locking manner in relation to moldings.

9 Claims, 7 Drawing Sheets

FIG. 9

FLAT GASKET RING

BACKGROUND OF THE INVENTION

The present invention relates to a flat gasket ring, in particular for arranging between two flange adapters in pipeline systems.

Transition connections are necessary when laying pipelines. These connections usually take place via moldings which are equipped with a flange adapter. In each case one flange is pushed over the molding which is to be connected, until said flange butts against a so-called welding collar. There are also moldings with an integrated flange. The sealing surfaces of the flange adapters of the two moldings which are to be connected to one another are brought into abutment with one another with the interposition of a flat gasket ring. The flanges are connected to one another by means of a plurality of screwed connections, in order for the seal, which is located between the sealing surfaces of the flange adapters, to be subjected to the contact pressure which is necessary for the fluid-tight connection. Flat gasket rings are used in the case of sealing surfaces without a groove.

A flat gasket ring usually has to be designed such that it covers at least the entire cross section of the sealing surface of the flange adapter, i.e. it extends from the internal diameter to the external diameter of the flange adapter. This should ensure a fluid-tight connection between two abutting moldings with a seal arranged between them. Since the flange encloses the gasket ring, the latter is difficult to position, and inaccurate centering and slipping during installation may lead to the gasket ring no longer covering the cross section of the sealing surface. This results in different pressures over the surface area in the sealing region, which in turn may result in leakage. It is thus often the case that, for example according to U.S. Pat. No. 5,472,214, extensions with openings are provided on gasket rings, the screws or assembly bolts of the flange connection being guided by way of said extensions and thus positioning the gasket ring in relation to the flange ring. In this case, the sizes of the flange screws, bolt-circle diameters and internal and external diameters of molding, flange adapter and flange, as well as other parameters, are defined by various standards which, with the exception of the internal diameter of the molding, are often not compatible with one another.

In particular in applications in high-purity pipeline systems, relatively accurate positioning of flat gasket rings is necessary since, otherwise, even extremely small gaps and openings in the region of the pipe/gasket-ring transition constitute undesired dead spaces. Such a transition has to be positively locking and smooth here, since uneven transitions cause turbulence in the flowing medium, which may have fluid-dynamic dead spaces.

Taking this prior art as the departure point, the object of the present invention is to propose a flat gasket ring which can be easily fixed in a predetermined position and is suitable for various standards. It should also be shaped and produced such that, once the necessary contact pressure has been applied, it produces a positively locking connection which has a smooth surface and does not have any dead spaces in relation to the medium in the interior of the pipe system.

SUMMARY OF THE INVENTION

This object is achieved by providing a flat gasket ring for producing a fluid-tight connection between two opposite moldings which are provided with flange adapters and have an internal diameter, through which the medium which is to be transported flows, and an external diameter, wherein flanges are pushed over the moldings and connected to one another by means of screws, to produce contact pressure on the gasket, wherein, in the outer circumferential region, the flat gasket ring has at least one lip structure which projects radially beyond the external diameter of the moldings and is designed for enclosing the moldings in an essentially positively locking manner. Further advantageous configurations can be gathered from the dependent claims.

The flat gasket ring according to the invention is distinguished in that it has self-centering structural elements. By virtue of a lip which is provided concentrically on both sides of the external diameter of the flat gasket ring, the flat gasket ring can be applied accurately over the surface of a standard ANSI Sygef flange. This lip may be severed in order to position the flat gasket ring in ISO/DIN Sygef flanges of larger diameters than those of the ANSI standard.

For this purpose there is located, over a relatively short section of a circle segment, a second lip structure which is arranged on a larger radius, corresponding to the ISO standard. Additional severing of this lip structure allows the flat gasket ring to be used as a conventional flat gasket ring, although this then has to be centered.

A slot-like cutout is arranged in a lateral extension in the region of the second lip structure. As a result, the flat gasket ring can be retained by an assembly bolt or screw during installation, thus preventing the flat gasket ring from dropping out.

BRIEF DESCRIPTION OF THE DRAWINGS

A preferred exemplary embodiment of the invention is explained in more detail with reference to the attached Figures, in which.

DETAILED DESCRIPTION

Figure 1:
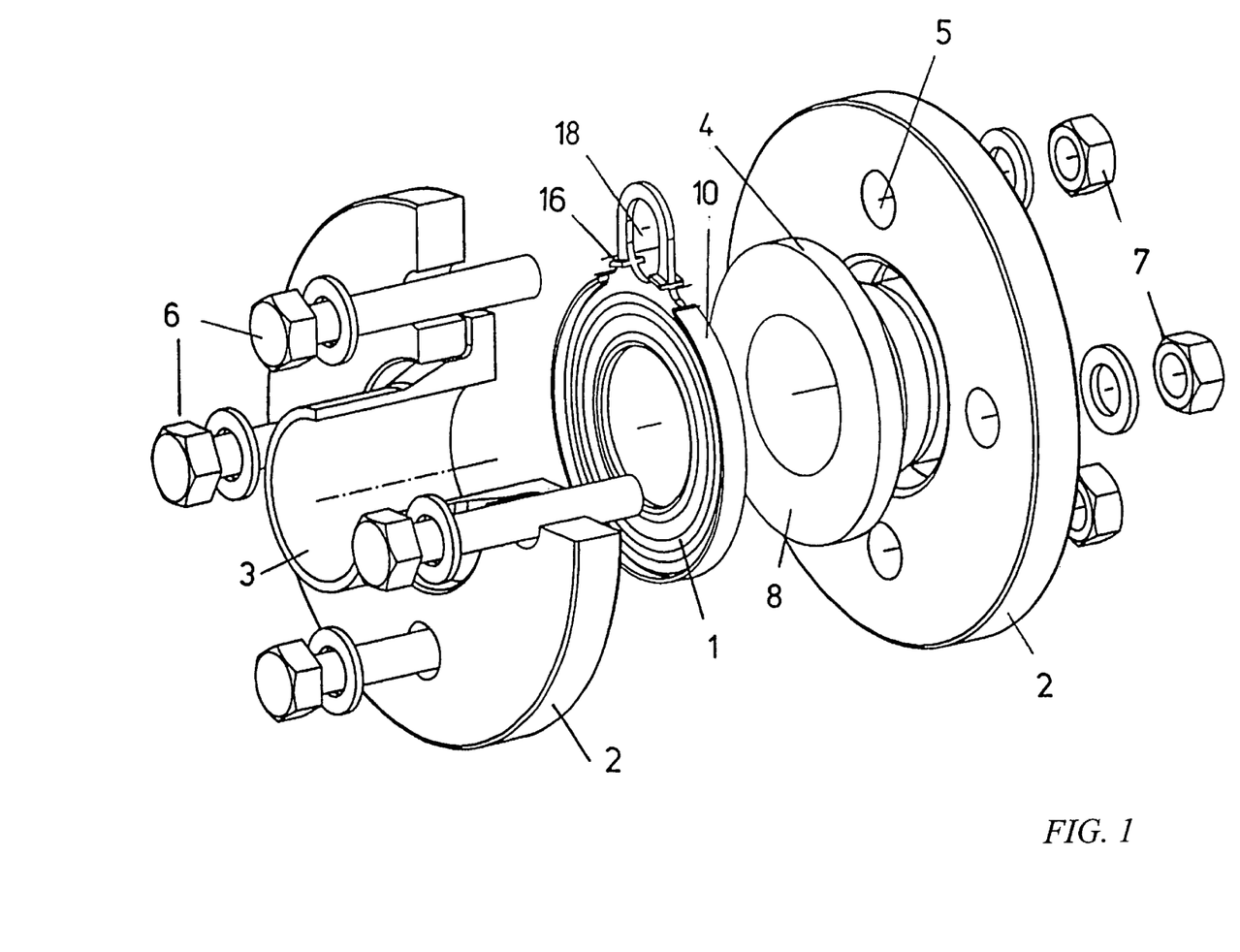
FIG. 1 shows a perspective view of the flat gasket ring, molding and flange assembly in accordance with the ANSI standard.

FIG. 1 shows, in a perspective illustration, the installation of the flat gasket ring 1 between two flange adapters in accordance with the ANSI standard. A flange 2 is pushed (with a small amount of play) in each case over a molding 3 provided with a collar 4, said flange having a plurality of symmetrically arranged openings 5 for receiving screwed connections 6. Screws 6 can be guided through respectively opposite openings 5 of the flanges 2, and the necessary contact pressure can be applied by tightening the associated nuts 7. In this case, the flat gasket ring 1, which is located between the sealing surfaces 8 of the collars 4, is compressed. The flat gasket ring is positioned in relation to the collar 4 by a lip 10, which butts against the external diameter of said collar 4. Since, as illustrated in FIG. 1, the flange 2 is pushed with play over the molding 3, there may be inaccuracies in the positioning in addition to those caused by tolerances of the openings 5 and screws 6 or bolt/flange connection.

Figure 2:
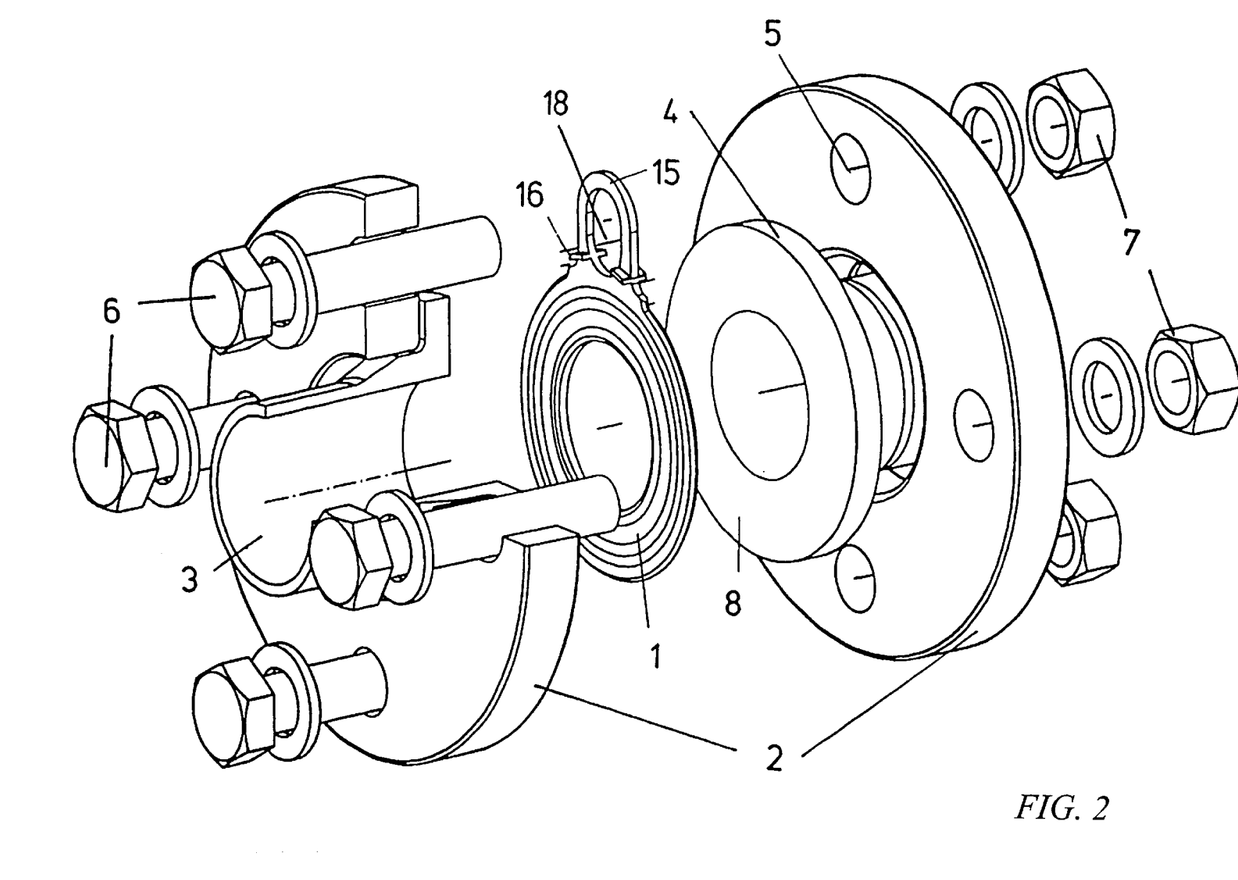
FIG. 2 shows a perspective view of the flat gasket ring, molding and flange assembly in accordance with the ISO standard.

FIG. 2 shows, in a perspective illustration, the installation of the flat gasket ring 1 between two flange adapters in accordance with the ISO standard. This differs from FIG. 1 in that the lip 10 shown here has been severed. The flat gasket ring 1, then, is positioned in relation to the collar 4 by lips 16 which butt against the external diameter of said collar 4.

Figure 3:
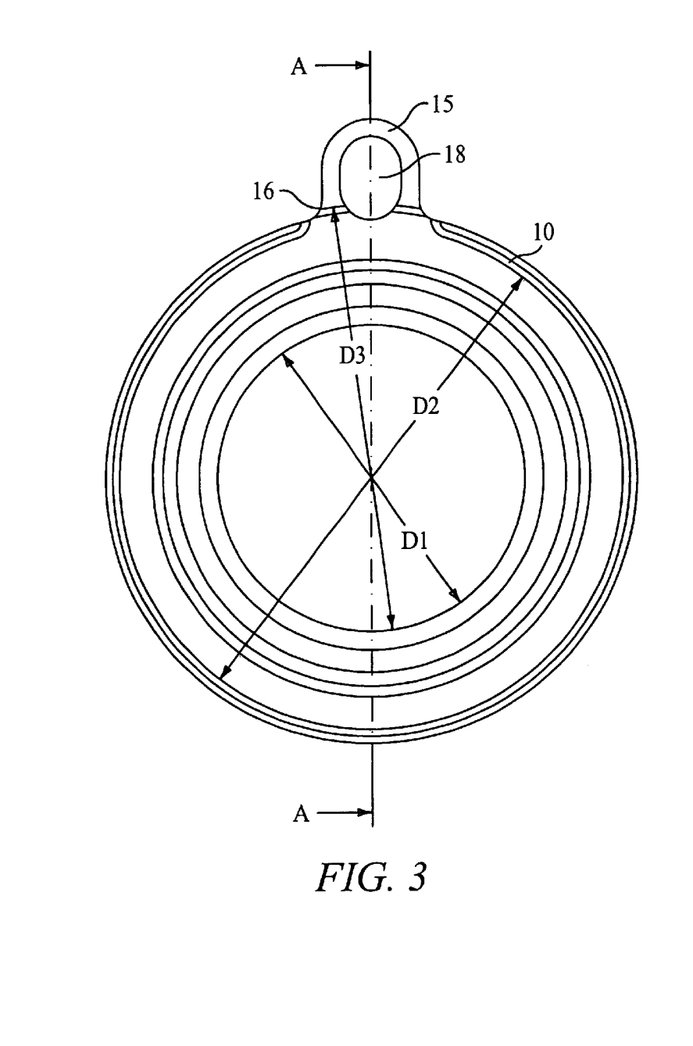
FIG. 3 shows a plan view of the flat gasket ring.
Figure 4:
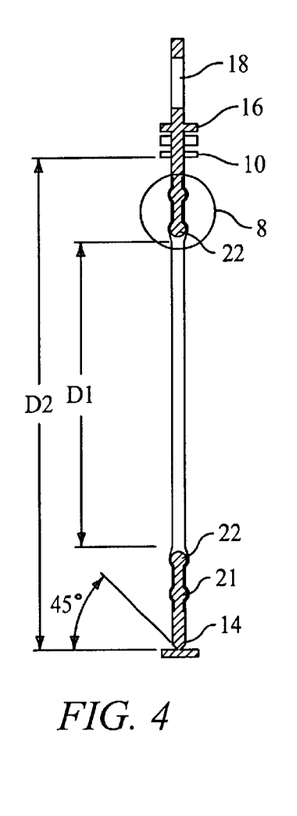
FIG. 4 shows a longitudinal section through the flat gasket ring.

FIG. 3 shows a plan view, and FIG. 4 shows a longitudinal section, of a flat gasket ring 1 which has an internal diameter D1, which designates the inner circumference of the flat gasket ring 1. D1 essentially defines the throughflow opening of a pipeline system. The external diameter D2 bounds the outer circumference of the flat gasket ring towards the outside and encircles the same virtually completely on both sides, serves for centering the flat gasket ring in relation to a flange adapter 2 in accordance with the ANSI standard. By virtue of a suitable selection of D2, the lip 10 butts accurately against the outer surface of the collar 4 of the ANSI flange adapter upon installation of the flat gasket ring 1, thus ensuring extremely accurate positioning of the flat gasket ring as far as its most important position, the internal diameter, is concerned. The positioning takes place in relation to the molding, provided with the flange adapter and sealing surface, and not in relation to a flange 2.

The connecting region 14, which is illustrated in FIG. 4 and is the region in which that part of the flat gasket ring which is located within D2 is connected to the lip 10, is chamfered, approximately at 45 degrees, on both sides; the resulting small material connection forms a predetermined breaking point at which the lip 10 can easily be severed.

Once said lip 10, which virtually fully encircles the flat gasket ring, has been severed, the flat gasket ring 1 can be used for connections to moldings of which the flange-adapter sealing surface has greater external diameters, for example for flange connections in accordance with the ISO standard.

Use is made here, in turn, of a lip structure which is arranged in a relatively short section of a circle segment with a larger radius. Two short arcuate lip portions 16 are arranged here on the flat gasket ring in each case on both sides of the extension 15 such that, upon installation of the flat gasket ring, said lip portions butt accurately against the outer surface of the collar 4 of an ISO flange adapter of a molding 3 and the flat gasket ring 1 thus has its internal diameter positioned in relation to that of the abutting molding 3.

Additional severing of this lip structure formed from the portions 16, for example by means of a blade, allows the flat gasket ring to be used as a conventional flat gasket ring, although it then has to be centered. By way of the slot 18, which is located in the extension 15 of the flat gasket ring 1, the flat gasket ring 1 can be secured in a conventional manner by means of a bolt or a screw 6 of the flange 2, thus preventing the flat gasket ring 1 from dropping out, and thus becoming soiled, during installation. The slot is arranged radially in relation to its longitudinal axis, its length being such that it is possible to use a flange connection in accordance with the ANSI, ISO and JIS standards.

Figure 5:
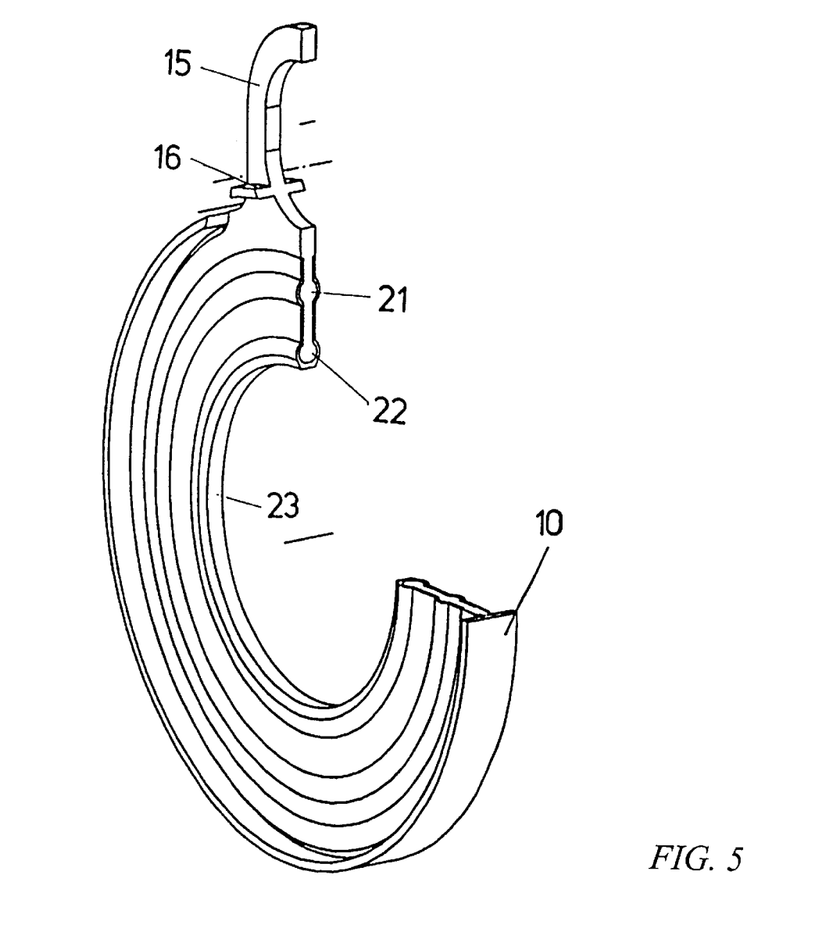
FIG. 5 shows a perspective view of a ¾-section of the flat gasket ring for use in accordance with the ANSI standard.

FIG. 5 shows a perspective view of a ¾-section of the flat gasket ring for installation in accordance with the ANSI standard. The lip 10 encloses the entire circumference of the gasket ring on both sides, with the exception of the region of the extension 15, on which the lip portions 16 are provided.

Figure 6:
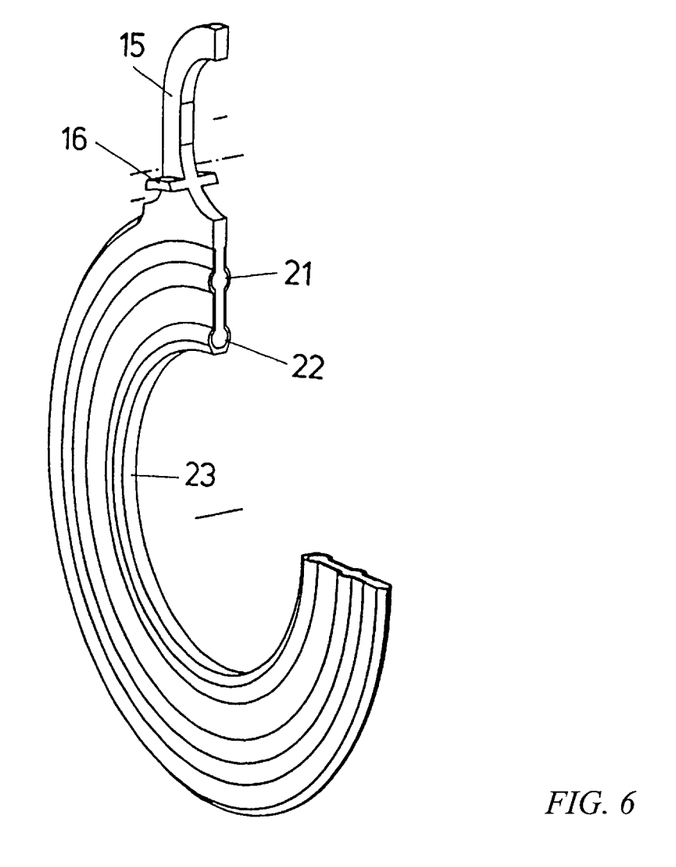
FIG. 6 shows a perspective view of a ¾-section of the flat gasket ring for use in accordance with the ISO standard.

FIG. 6 shows a perspective view of a ¾-section of the flat gasket ring for installation in accordance with the ISO standard. The lip 10 from FIG. 5 has been severed and the positioning takes place by the lip portions 16, which are likewise formed on both sides of the gasket ring.

Figure 7:
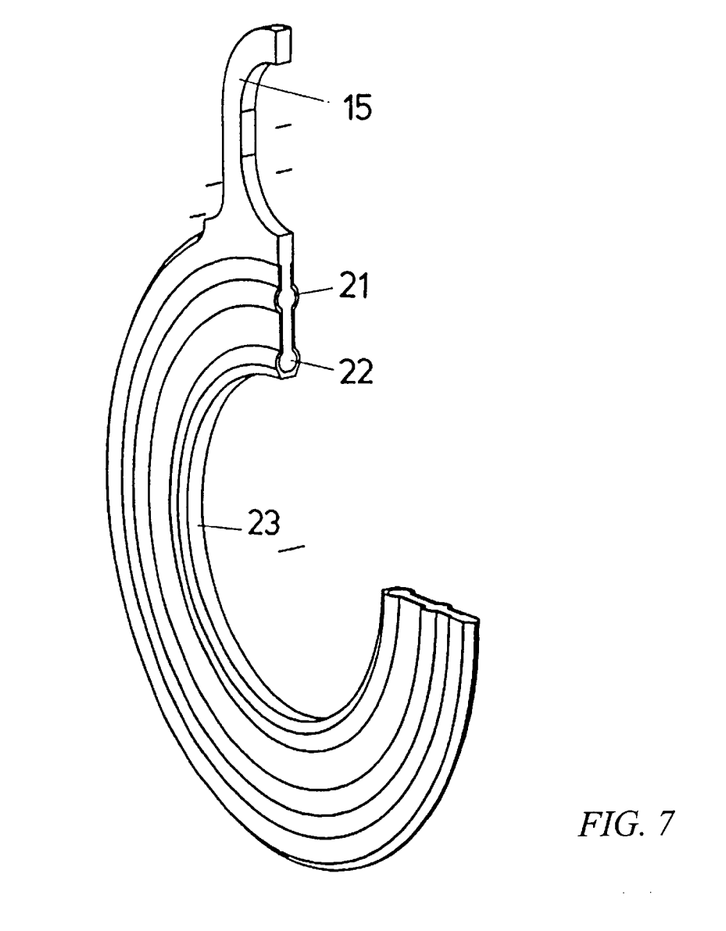
FIG. 7 shows a perspective view of a ¾-section of the flat gasket ring for use in accordance with the JIS standard or other standards.

FIG. 7 shows a perspective view of a ¾-section of the flat gasket ring for installation in accordance with the JIS standard or other standards. Since both the lip 10 and the lip portions 16 have been removed, the gasket ring corresponds largely to a normal gasket ring, which has the possibility of being secured by a slot during installation.

The proposed flat gasket ring may be produced from various materials, but it preferably comprises an elastomer body 19 which, during the production process, is connected to a second, PTFE-like material 20 in the region of the internal diameter. The elastomer 19 has a predetermined strength and elasticity and ensures the mechanical stability both at normal and at elevated temperatures. The PTFE-like material 20 has high chemical resistance and smooth surfaces, it is chemically inert and exhibits little outgasing. It forms a barrier which allows the flat gasket ring to be used for high-purity applications. The elastomer 19 is encased with the second material such that there is no material overflow present in the region which may come into contact with throughflowing medium.

Figure 8:
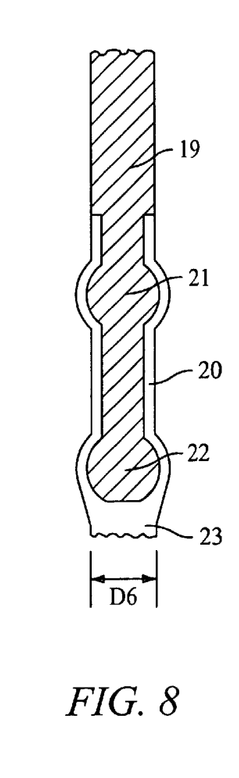
FIG. 8 shows an enlargement of a detail of the longitudinal section from FIG. 4.

The detail enlargement according to FIG. 8 shows the cross section of the flat gasket ring in the region of the inner radius for the case where the flat gasket ring is not subjected to any contact-pressure forces. The elastomer core 19, which is uniformly enclosed by polytetrafluoroethylene-like material 20, has two circular beaded portions 21 and 22. The free beaded portion 22 terminates with a planar surface 23.

Figure 9:
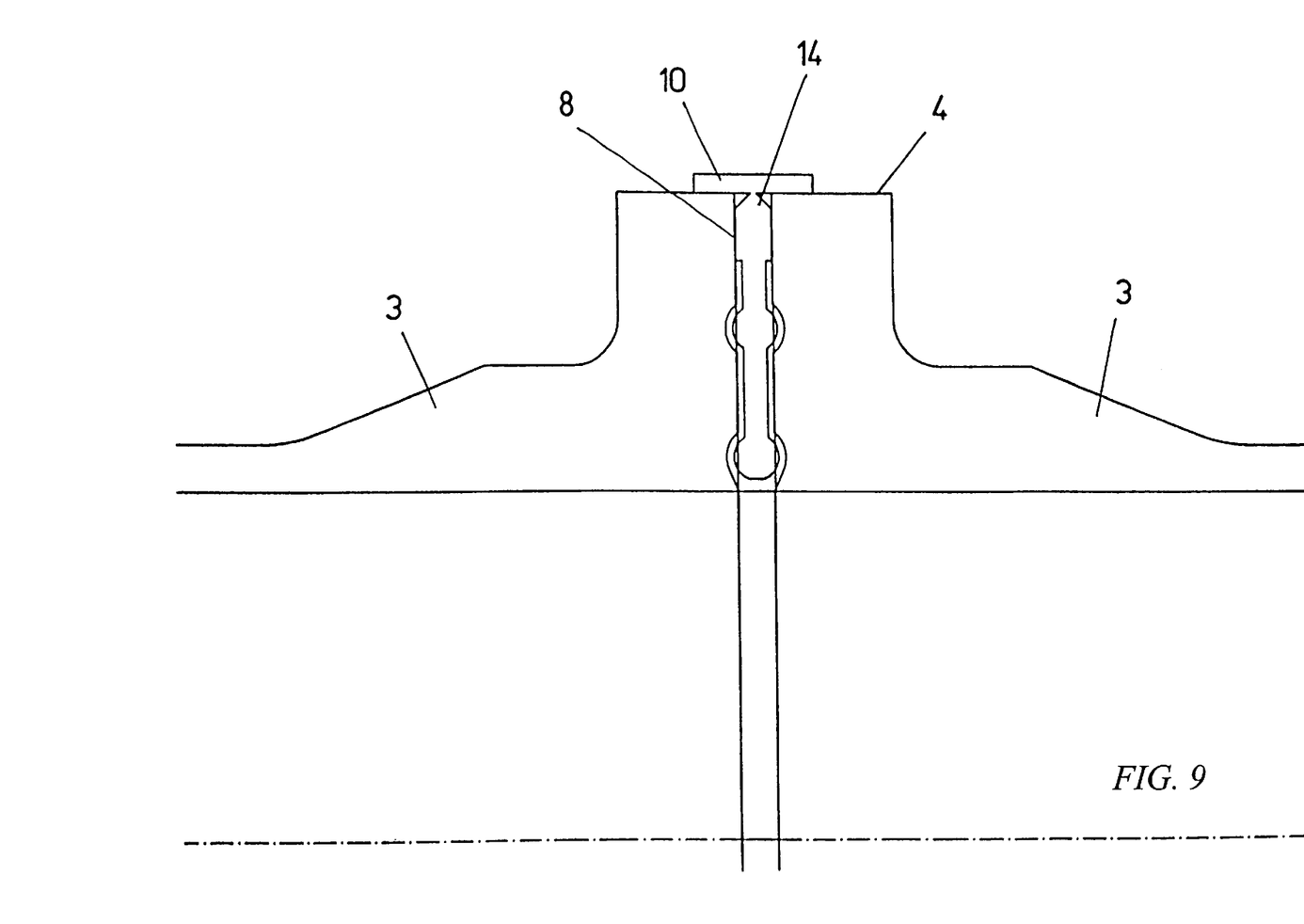
FIG. 9 shows the flat gasket ring installed and compressed.

In FIG. 9, then, the flat gasket ring is compressed as a result of the contact-pressure forces of the flange screwed connection, and this thus results in deformation of the beaded portions 21 and 22, which presses the planar surface 23 radially inward. The original diameter D1 is selected such that this reduction in size of the diameter causes the planar surface 23 of the free bead 22 to terminate flush with the inner surface of a molding.

The chemically inert top face of the planar surface 23 is the only region of the flat gasket ring which comes into contact with a medium which is to be transported. The width D6 of the planar surface 23 is selected such that, when the correct contact-pressure forces are applied, the flat gasket ring is compressed to this width D6.

The seal described very easily covers a wide range of possible applications.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A flat gasket ring for producing a fluid-tight connection between two opposite moldings which are provided with flange adapters and have an internal diameter, through which the medium which is to be transported flows, and an external diameter, wherein flanges are pushed over the moldings and connected to one another by means of screws, to produce contact pressure on the gasket, wherein, in the outer circumferential region, the flat gasket ring has at least one lip structure which projects radially beyond the external diameter of the moldings and is designed for enclosing the moldings in an essentially positively locking manner wherein the flat gasket ring is chambered at the connection to the lip structure to form a predetermined breaking point for severing the lip structure from the flat gasket ring.

2. The flat gasket ring as claimed in claim 1, wherein there is provided an extension which projects radially beyond the external diameter of the moldings to beyond the region of the screwed connection of the flange ring.

3. The flat gasket ring as claimed in claim 2, wherein the extension has a radially arranged slot-like cutout which is intended for accommodating, at least partially in a positively locking manner, a screw or a bolt of a flange-ring screwed connection.

4. The flat gasket ring as claimed in claim 1, wherein the lip structure has a circumference which is arranged on a circle of diameter D2, the diameter D2 corresponding to the external diameter of the flange adapters.

5. The flat gasket ring as claimed in claim 2, wherein, in the region of the extension, circle-arc-shaped lip structure is arranged on a diameter D3, which is greater than the external diameter of flange adapters.

6. The flat gasket ring as claimed in claim 5, wherein the lip structure comprises two circle-arc-shaped lip portions.

7. The flat gasket ring as claimed in claim 1, wherein the flat gasket ring comprises means for installing the inner surface of the flat gasket ring in a flush manner in relation to the inner surfaces of the two moldings.

8. The flat gasket ring as claimed in claim 7, wherein the means comprise at least one concentrically arranged annular bead, the free inside of the inner bead forming the internal diameter of the flat gasket ring and being of flattened design over a length D6, which is equal to the desired thickness of the installed gasket ring.

9. The flat gasket ring as claimed in claim 1, wherein the flat gasket ring is produced from an elastomer which, in the inner circumferential region, is fully encased by a polytetrafluoroethylene material of high chemical resistance and with a smooth surface.

* * * * *